US006619565B1

United States Patent
Abbott

(10) Patent No.: US 6,619,565 B1
(45) Date of Patent: Sep. 16, 2003

(54) IRRIGATION SYSTEM

(76) Inventor: Timothy A. Abbott, 1829 Nash St., South Bend, IN (US) 46613

( * ) Notice: Subject to any disclaimer, the term of this patent is extended or adjusted under 35 U.S.C. 154(b) by 236 days.

(21) Appl. No.: 09/945,275

(22) Filed: Aug. 31, 2001

(51) Int. Cl.$^7$ ................................................ B05B 15/06
(52) U.S. Cl. ...................... 239/273; 239/276; 239/542; 239/547; 239/581.1; 47/33; 52/102; 137/318; 137/323
(58) Field of Search ................................ 239/273, 275, 239/276, 271, 272, 279, 547, 542, 569, 581.1; 47/33; 52/102; 404/7, 8; 138/114, 115; 137/318, 323; 251/145, 209, 309

(56) References Cited

U.S. PATENT DOCUMENTS

| | | | | |
|---|---|---|---|---|
| 3,252,475 A | * | 5/1966 | Jones | 137/318 |
| 4,945,675 A | * | 8/1990 | Kendrick | 47/33 |
| 5,535,545 A | * | 7/1996 | Matz | 52/102 |

* cited by examiner

Primary Examiner—Michael Mar
Assistant Examiner—Dinh Q. Nguyen
(74) Attorney, Agent, or Firm—Leo H. McCormick, Jr.

(57) ABSTRACT

An irrigation system for selectively providing water to various plants in a relative same area with different rates of application of water. The system has a first valve for connecting a water supply with a tube in a edging. The edging has vertical web with a flange for locating the tube in a fixed position within the area with respect to various plants. A plurality of second control valves are located on the tube in a plane tangent to the web such that a first end cap on each of the control valves is below an apex of the tube. Each second valve is characterized by a body having a first projection that extends into the tube. The body has a stepped axial bore that extends into the first projection to meet a cross bore for communicating water presented to the tube into the stepped axial bore. The stepped axial bore is connected to an outlet port in a first end cap by an internal port. The first end cap has a radial groove that snaps on to a rib that surrounds the port to resiliently join the first end cap to the body. The stepped axial bore has a radial groove that receives a rib formed on a cylinder of a second end cap to join the second end cap to the body. The cylinder of the second end cap has an axial passage through which stepped bore is connected to the outlet port. The second end cap is rotatable from a first position where the cylinder covers the internal port to seal the stepped bore from the outlet port to a second position where water presented to the stepped bore is communicated to an outlet port in the first end cap for distribution to an individual plant to promote optimum growth for an individual plant.

14 Claims, 2 Drawing Sheets

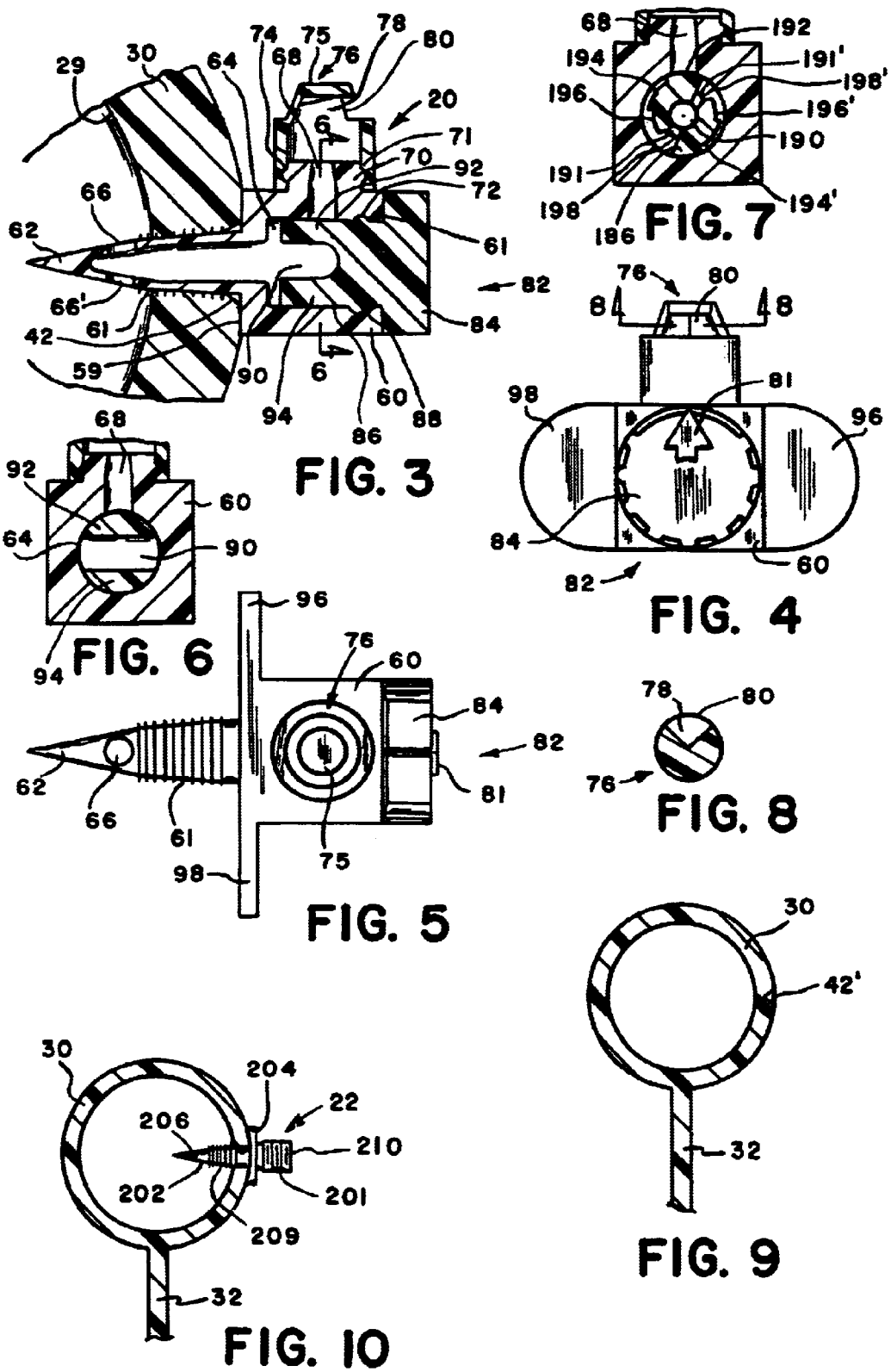

IRRIGATION SYSTEM

This invention relates to a system for irrigating areas having a plurality of plants that require different amounts of water to reach optimum growth potential.

BACKGROUND OF THE INVENTION

U.S. Pat. Nos. 5,232,159, 5755,383 and 6,138,405 disclose the use of edging for watering plants in a flowerbed separated from lawn. The tube portion of such edging has a plurality of slits or openings therein through which water is uniformly sprayed onto plants in the flowerbed. It was further disclosed in U.S. Pat. No. 5,232,159 that the slits or openings could be placed in a pattern in the tube to selectively spray certain plants. This pattern may be beneficial for one year but it is not unusual for a gardener to locate plants in different areas from one year to another year to change the decor of the landscape. Since the same plants are not located in a same place year after year different water patterns are required and as a result if the edging is not replaced some plants may receive too much water and other plants not enough. While it may be possible to close some of the slits or openings by plugs and cut new openings or slits in a desired location most often the section of existing edging is discarded and a replacement section of edging is purchased to meet a new watering pattern.

SUMMARY OF THE INVENTION

A primary object of the present invention is to provide a system of irrigation using a tube formed integral within edging to communicate water to plants through a plurality of individual control valves that can be selectively adjusted to regulate the flow water to individual plants in a manner to promote optimum growth potential for each plant.

According to this invention each control valve is characterized by body having a first projection that extends into the tube associated with the edging in a plane substantially perpendicular to a web of an edging. In addition, each control valve is positioning on the tube in a desired location such that a first end cap retained on the body is below an apex of the tube. Each body is further defined by a stepped axial bore that extends into the first projection and a cross bore in the first projection through which water present in the tube is communicated into the stepped axial bore. The stepped axial bore is connected to an outlet port in the first end cap by a port that extends through a second projection on the body and a bore or passage in the first end cap. An external first annular rib that surrounds the port and receives a first radial groove on the first end cap to resiliently secure the first end cap with the body. The stepped axial bore has a first annular groove that receives a rib on a cylinder that extends from a base on a second end cap to resiliently hold the second end cap in the stepped bore and seal the stepped bore from the environment. The cylinder on the second end cap has an axial passage that separates a first arcuate axial segment from a second arcuate axial segment. The axial passage is connected to the stepped axial bore such that in a first position one of the first and second arcuate axial segments cover the port in the body to seal the stepped bore from the outlet port in the first end cap. The second end cap is rotatable from the closed or first position to an opened or second position where the axial passage in the cylinder is connected to the outlet port the first end cap by way of the bore or passage therein and correspondingly the stepped axial bore with water present therein is connected to the outlet port in the first end cap to allow water to be communicated to the outlet port and be directed to an individual plant as a function of the amount of water needed to achieve optimum growth.

An advantage of this invention resides in the ability to selectively adjust and direct the flow of a quantity of water to an individual plant to promote optimum growth.

A still further advantage of this invention resides in ability to selectively locate a valve on a tube of an edging by a self-piercing projection on a control valve.

A still further advantage of the present invention resides in the control valve having a first end cap located below an apex of a tube to protect the control valve from being damaged while retaining an ability to direct a flow water to an individual plant.

BRIEF DESCRIPTION OF THE DRAWINGS

FIG. 3 is a sectional view of a control valve for the irrigation system taken along lines 3—3 of FIG. 2;

FIG. 4 is an end elevation view of the control valve of FIG. 3;

FIG. 5 is a top view of the control valve of FIG. 4;

FIG. 6 is a sectional view taken along line 6—6 of FIG. 3;

FIG. 7 is a sectional view of an alternate embodiment of a cylinder for the second end cap as illustrated in FIG. 6;

FIG. 8 is a sectional view taken along line 8—8 of FIG. 4;

FIG. 9 is a sectional view taken along line 9—9 of FIG. 2; and

FIG. 10 is a sectional view illustrating a connector inserted in the tube illustrated in FIG. 9.

DETAILED DESCRIPTION

Figure 1:
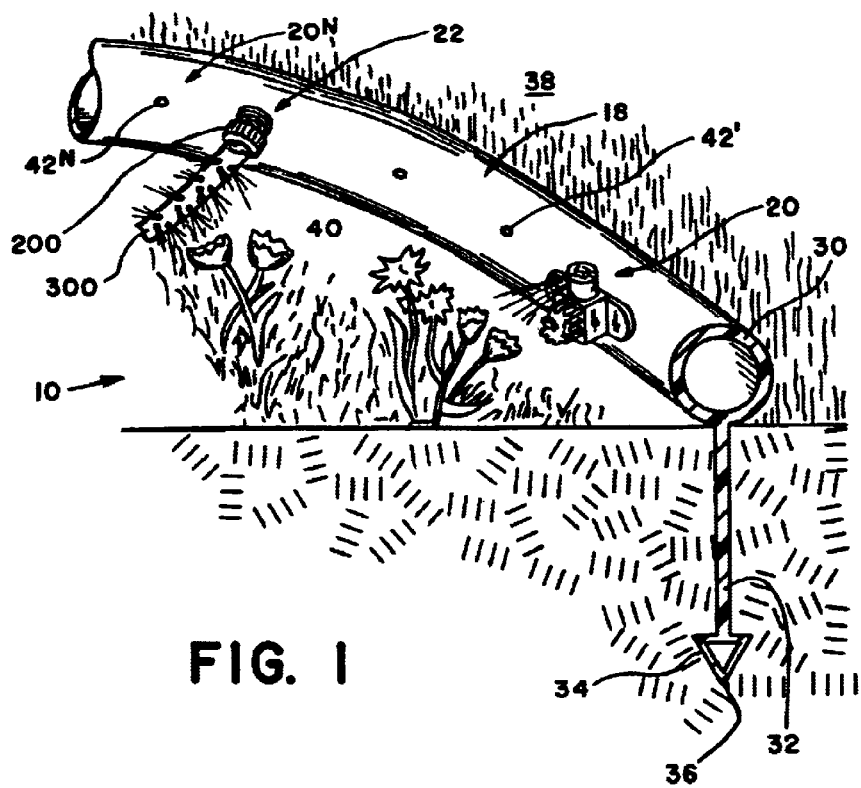
FIG. 1 is a schematic illustration of an irrigation system having a control valve made according to the principals of the present invention.
Figure 2:
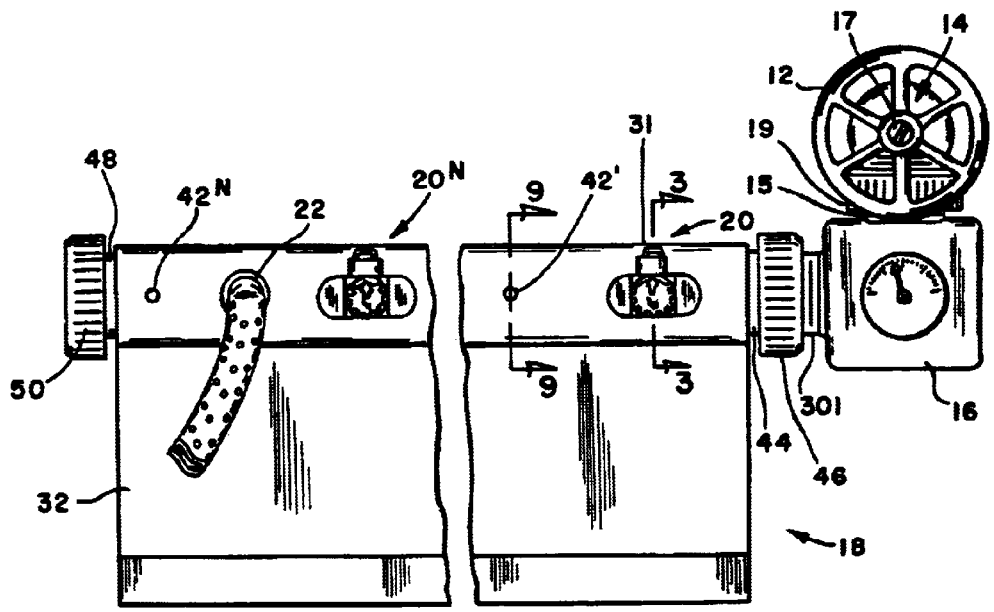
FIG. 2 is a schematic illustration of various components in the irrigation system of FIG. 1.

The irrigation system 10 as illustrated in FIGS. 1 and 2 is designed to selectively provide water to a variety of plants separated from grass in lawn by edging 18. The plants and lawn have a different need for water to provide for optimum growth. Optimum growth being effected by other various factors including the prevailing temperature, exposure to the sun, whether flowering or going into a dormate state but primarily by water both in duration and time of application.

The irrigation system 10 includes a source of water which is controlled by a shut-off valve 14, a timer 16 to limit the length of time for water to flow from the shut-off valve 14, a segment of edging 18 connected to the shut-off valve 14 and timer 16 by a hose 301, and plurality of control valves 20,20', . . . 20'' and connectors 22,22', . . . 22'' selectively located with respect the edging 18 for directing water to the various plants located in the area (flower bed 40).

The components necessary for understanding the invention of this irrigation system 10 will hereinafter be described in more particular detail.

The shut-off valve 14 is of a well known and of a type wherein knob 12 is rotated to move a face on a stem 17 away from a seat to allow water from a source to flow from a spigot 19. The volume of water that flows from the spigot 19 has a substantial uniform and constant fluid pressure that normally is between 15–20 psi.

The timer 16 is well known and of a type that provides for programming both the time for water to begin to flow from a spigot 19 and the length of time for water to flow from the spigot 19. Timer 16 has an internal valve that opens at the start of the flow and closes after the set time to terminate to flow of water from spigot 19 to edging 18.

Edging 18 is defined by a tube 30 having a first end 44 with a first connector 46 connected by a hose 301 to timer 16 and a second end 48 connected to another segment of edging (not shown) by a second connector 50 or a end plug. A vertical web 32 that extends from the axis of the tube 30 has a horizontal flange 34 with a point 36 thereon for positioning the vertical web 32 in the ground. Once the web 32 is placed in the ground to separate an area of grass 38 from a flowerbed 40, the horizontal flange 34 assists in holding tube 30 is a fixed location above the ground and adjacent various plants. The tube 30 has a plurality of marks or indents 42,42', . . . 42$^n$ located at a tangent thereon at a point that is substantially perpendicular to web 32 as illustrated in FIG. 9. The marks or indents 42,42', . . . 42$^n$ provide a location for a gardener to selectively locate a control valve 20 or connector 22 in a manner as hereinafter discussed.

Each of the plurality of control valves 20,20', . . . 20$^n$ are identical and only valve 20 is described herein detail.

Control valve 20 as best illustrated in FIGS. 3, 4, 5, 6 and 8 has body 60 with a first projection 62 thereon. Projection 62 designed to be inserted into tube 30 at a desired mark or indent 42 and located in a plane that is substantially perpendicular to the web 32 on edging 18. The body 60 has a stepped axial bore 64 that extends into the first projection 62 such that tube 30 is connected to the stepped bore 30 by way of a cross bore 66,66' through which a volume of water available in the tube 30 is communicated into the stepped bore 64. Body 60 is further defined by a port 68 from the stepped bore 64 that extends into a second projection 70 and first radial groove 72 in the stepped bore that is located adjacent face 61. Body 60 is further defined by an external peripheral rib 71 that surrounds the second projection 70 and is designed to mate with a groove 74 in a first end cap 76. The first end cap 76 has a bore or passage 78 therein that connects port 68 with an opening 80 that defines an outlet port for the stepped bore 64. Opening 80 which may best understood by viewing the illustration in FIGS. 3, 4 and 8, has an arcuate shape with a length equal to approximately 90 degrees of the top 75 of the first end cap 76. The first end cap 76 is designed to rotate on peripheral rib 71 which will allow a gardener to selectively direct water toward an individual plant within a line perpendicular to tube 30. A second end cap 82 has an annular base 84 with a cylinder 86 extending therefrom and located in the stepped axial bore 64 of body 60. Cylinder 86 has a peripheral surface 92 with a second annular rib 88 located thereon, the annular rib 88 is designed to mate with and be located in groove 72 in body 60 to seal the stepped axial bore 64 from the surrounding environment. Cylinder 86 has an axial passage 90 therein that separates a first arcuate axial segment 92 from a second arcuate axial segment 94, see FIGS. 3 and 6. The axial passage 90 is connected to the stepped axial bore 64 and receives water at the same pressure as presented to the stepped axial bore 64 from tube 30. The tolerance between groove 72 and rib 88 are such that the water pressure is low enough such that once the second end cap 82 is secured to body 60 no leaks occur however, the fluid pressure of the water in axial passage 90 acts on and urges the first 92 and second 94 axial segments into engagement with the stepped axial bore 64 to assist in sealing the stepped axial bore 64.

Control valve 20 is further defined by first 96 and second 98 ears that extend from body 60. The first 96 and second 98 ears provide a surface or lever through which a force is applied to screw threads 61 on projection 62 into tube 30. In addition when aligned the first 96 and second 98 ears are located in a parallel or horizontal plane with tube 30, the first end cap 76 is in a position or plane which is perpendicular to tube 30.

FIG. 7 illustrates a second embodiment of a cylinder 186 for the second end cap. The cylinder 186 has an axial passage 190 that is connected to its peripheral surface 192 by a cross passage 191,191'. The peripheral surface 192 is distinguished by a plurality of sequential larger axial slots 194,194', 196,196' and 198,198' which are directly connected to the stepped bore 64. The axial slots 194,194', 196,196' and 198,198' are also connected to by axial passage 190 by cross passage 191,191'. For some applications, this cylinder 186 for the second end cap may provide for the internal flow of water to port 68 in a smooth manner. In this structure, the rotation of the second end cap to open communication between the first 194,194' axial slot and port 68 provides for a first flow rate from the stepped bore 64 to the outlet port 80, to open communication between the second 196,196' axial slot and port 68 provides for a second flow rate from the stepped bore 64 to the outlet port 80 and to open communication between the third 198,198' axial slot and port 68 provides for a third flow rate from the stepped bore 64 to the outlet port 80.

The irrigation system 10 anticipates the use of a plurality of control valves 20 and connector 22 which provides for the attachment a soaker hose 300 in FIG. 2 or length of hose for watering plants a distance away from the edging 18. Connector 22 as best shown in FIG. 10 has a cylindrical body 201 with a tapered projection 202 extending from a flange 204. Cylindrical body 201 has an axial bore (similar to bore 30 in body 60) therein that extends into the tapered projection 202 and is connected with a cross bore 206 to define a flow path from tube 30 to outlet port 208. The tapered projection 200 has threads 209 thereon that are screwed into tube 30 at a desired location with respect to a watering need in the flower garden 40. Hose 300 shown in FIG. 2 as being connected to connector 22 has a porous surface and is connected to the outlet port 208 to allow water to flow from tube 30 into an area of the flower garden at a desired flow rate to promote optimum growth of vegetation in that particular area.

Method of Assembly of a Control Valve

The control valve 20 which is in essence made up of a body 60, the first end cap 76 and the second end cap 82. Body 60, which is distinguished by a threaded projection 62, an annular projection 70 with a rib 71 thereon and a stepped axial bore 64, is selected from a supply source. A first end cap 76, having a bore 78 therein with a groove 74, is attached to body 60 by pushing the end cap 76 on to projection 70 until groove 74 snaps around rib 71 to resiliently hold or join the first end cap 76 to body 60. A second end cap 82, which is distinguished by an annular base 82 with a cylinder 86 and a rib 88 on the cylinder, is selected from a source of supply and the cylinder 86 inserted into the stepped bore 64 until rib 88 snaps into groove 72 to resiliently join the second end cap 82 with body 60 to complete the assembly of a control valve 20.

An Irrigation Plan for an Area

Once a gardener has devised a scheme for arranging plants to landscaping an area which may includes several different flowers or plants and desires to separate a grassy area 38 from flowerbed 40, a segment of edging 18 is appropriately placed in the ground. The edging 18 has marks 42 thereon with identify indents in tube 30 where the sidewall of the tube 30 may have a lesser thickness. After plants are placed in the ground, a first control valve 20 is located on tube 30 by inserting the point on the end of projection 62 into a mark 42 and pushing as the projection 62 with an axial force sufficient to pierce tube 30. When projection 62 pierces tube 30, a rotative force is applied to ears 96 and 98 and the body 60 is screwed into tube 30 until face 59 engages tube 30 to fix the body 60 to tube 30 at which time cross bore 66,66' will be located in the bore 29 of tube 30 in a manner as illustrated in FIG. 3 and the first end cap 76 is located below the apex 31 of the tube 30 as shown in FIG. 2.

The number of control valves 20 attached to edging 18 is dependent on the location and number of the plants in the flower garden 40 but as illustrated in FIG. 2. When more than one type of plant is in the flower garden the second end cap 82 on each individual control valve 20 may be adjusted to provide an amount of water for such plant to achieve optimum growth.

As shown in the illustration in FIG. 10, a connector 22 is located on tube 30 by the insertion of a self piercing threaded projection 202 into tube 30 by screwing threads 209 into tube 30. A cap (not shown) may be attached to the outlet port 208 when plants in the area of the connector 200 do not need to be watered or as shown in FIG. 2 hose 300 attached thereto to water the plants.

Method of Irrigation

A gardener programs timer 16 with information as to the length of time and the hour at which the irrigation system 10 is to turn on for watering plants in the flower garden 40. Knob 12 of shut-off valve 14 is turned to the on position where water from a supply is made available to the inlet 15 of timer 16. At the hour the gardener desires to water plants in the flower garden, the valve in timer 16 opens and water is presented to tube 30 in the edging 18. At each of the plurality of control valves 20, indicator 81 on the second end cap 82 may initially be in an off position as illustrated in FIG. 4. In the off position, one of the first 92 and second 94 arucate axial segments covers port 86 and the stepped bore 64 is isolated from outlet port 80 in the first end cap 76. To get water flow from the control valve 20, the second end cap 82 is rotated to create a relationship between an edge on one of the first 92 and second 94 arcuate segments and port 68 to allow for the metered flow of water into bore or passage 78 for distribution to outlet port 80 for distribution to a plant at desired rate of flow of water to provide for optimum growth of an individual plant. The first end cap 76 may be rotated on the second projection 70 to further direct the flow of water to the individual plant.

Each individual control valve 20 in the irrigation system 10 is adjusted to control the flow of water to a corresponding plant according to the water need of the plant and as a result the optimum growth of individual plants can be achieved. A desired flow of water from an individual control valve 20 may be changed by rotation of the second end cap 82 to change the space relationship between the first 92 and second 94 arcuate segment and port 68 but will remain the same the next time the timer 16 valve opens to supplies water to tube 30.

I claim:

1. An system for selectively irrigating various plants in a relative same area with different rates of application of water comprising:

a first valve connected to a source of water for controlling the flow of a volume of water having a substantially constant fluid pressure;

a tube having a vertical web extending therefrom, said web having a flange for retaining said tube in a fixed position within said area and adjacent various plants, said tube being connected to said first valve for receiving said volume of water; and a second valve having a body with a first projection thereon positioned in said tube in a plane substantially perpendicular to said web, said body having a stepped axial bore that extends into said first projection, a cross bore in said projection for communicating said volume of water available in said tube to said stepped axial bore, a first radial groove located in said stepped axial bore, a second projection with a port therein connected to said stepped axial bore, a first annular rib that surrounds said second projection, a first end cap having a bore therein and an opening therein that defines an outlet port, said bore in said first end cap having an second annular groove for receiving said first annular rib to resiliently join said first end cap with said body, and a second end cap having a base with a cylinder extending therefrom, said cylinder having a second annular rib located on its peripheral surface and an axial passage therein that separates a first arcuate axial segment from a second arcuate axial segment, said second annular rib being received by said first radial groove to resiliently join said second end cap to said body and seal said stepped bore, said axial passage in said second end cap being connected to said stepped axial bore in said body, said second end cap being rotatable from a first position where one of said first and second arcuate axial segments cover said port in said body to seal said stepped bore from said bore in said first end cap to a second position where said port in said body is uncovered to bring said axial passage in said second end cap into alignment with said port to connect said stepped bore in said body with said bore in said first end cap to allow water to flow to said outlet port and be directed to an individual plant as a function of an amount of water needed to achieve optimun growth.

2. The system as recited in claim 1 wherein a relationship between an edge of one of said first and second arcuate axial segments and said port in said body creates metered flow of water corresponding to a rotational position of said second end cap to establish a desired rate of flow of water to an individual plant.

3. The system as recited in claim 2 wherein said fluid pressure present in said water presented to said stepped axial bore acts on and urges said first and second arcuate axial segments into engagement with said stepped axial bore to assist in sealing the stepped axial bore.

4. The system as recited in claim 1 wherein said opening in said first end cap is characterized by an arcuate shape that extends approximately 90 degrees, said first end cap being rotatable on said first annular rib to selectively direct water toward an individual plant.

5. The system as recited in claim 1 wherein first projection is characterized by a point capable of penetrating said tube at a location selected by an operator and has threads thereon which engage, seal and fix said projection and body to said tube.

6. The system as recited in claim 1 wherein said second valve is further characterized by first and second ears that extend from said body through which a force is applied to screw said threads into said tube and to provide a guide for aligning said first end cap in a plane perpendicular to said tube.

7. The system as recited in claim 6 further characterized by said first projection on said body is located in said tube at approximately a tangent parallel to said web such that said first end cap of on said body is located below an apex of said tube to reduce the possibility of being damaged.

8. The system as recited in claim 7 further characterized by a third valve identical to said second valve and selectively located in said tube by a first projection on the body of said third valve penetrating said tube at a tangent parallel to said web, said second end cap on said third valve being rotated to selectively provide a second plant with a quantity of water to induce optimum growth.

9. The irrigation system as recited in claim 1 further characterized by a connector having a body having a cylindrical body with a tapered projection extending from a flange, said cylindrical body having an axial bore therein that extends into said tapered projection and joins a cross bore in said axial bore to define a flow path from said tube into said axial bore, said connector being joined with a second tube having a porous surface that allows water from said tube to be communicated to the area at a desired flow rate.

10. The irrigation system as recited in claim 1 wherein said tube is characterized by a plurality of marks located thereon at a tangent to said web to assist an operator in locating additional sites for valves similar to said second valve.

11. The irrigation system as recited in claim 1 wherein said cylinder of said second end cap is characterized by a first axial slot located on its peripheral surface, said first axial slot extending to and being connected with said axial bore to define a first flow path for a first quantity of water, said cylinder on being rotated to a first position to allow said first quantity of water to be communicated through said outlet port to an said individual plant.

12. The irrigation system as recited in claim 11 wherein said cylinder of said second end cap is further characterized by a second axial slot on its peripheral surface adjacent said first axial slot, said cylinder on being rotated to a second position defining a second flow path with respect to said port by way of said first and second axial slots to allow a second quantity of water to be communicated through said outlet port to said individual plant.

13. The irrigation system as recited in claim 12 wherein said cylinder of said second end cap is further characterized by a third axial slot on its peripheral surface adjacent said second axial slot, said cylinder on being rotated to a third position defining a third flow path to said port by way of said first, second and third slots to allow a third quantity of water to be communicated through said outlet port to said individual plant.

14. The irrigation system as recited in claim 1 wherein said base of second end cap is further characterized by an indicator which is aligned parallel with said first end cap to position one of said first and second arcuate axial segments to close said port and seal said stepped bore from said bore in said first end cap.

* * * * *